US006785798B2

(12) United States Patent
Chou (10) Patent No.: US 6,785,798 B2
(45) Date of Patent: Aug. 31, 2004

(54) METHOD AND SYSTEM FOR CIRCULAR ADDRESSING WITH EFFICIENT MEMORY USAGE

(75) Inventor: Hong-Chi Chou, Hsin-Chu (TW)

(73) Assignee: Macronix International Co., Ltd., Hsinchu (TW)

( * ) Notice: Subject to any disclaimer, the term of this patent is extended or adjusted under 35 U.S.C. 154(b) by 221 days.

(21) Appl. No.: 09/927,208

(22) Filed: Aug. 10, 2001

(65) Prior Publication Data

US 2003/0033499 A1 Feb. 13, 2003

(51) Int. Cl.[7] ............................................. G06F 12/00
(52) U.S. Cl. ..................... 711/220; 711/110; 711/211; 711/217; 711/219
(58) Field of Search ............................. 711/109, 110, 711/217, 219, 220, 218, 200, 211

(56) References Cited

U.S. PATENT DOCUMENTS

| | | | |
|---|---|---|---|
| 4,202,035 A | 5/1980 | Lane | 711/217 |
| 4,800,524 A | 1/1989 | Roesgen | 711/217 |
| 4,809,156 A | 2/1989 | Taber | 711/217 |
| 5,249,148 A | 9/1993 | Catherwood et al. | 708/491 |
| 5,381,360 A | 1/1995 | Shridhar et al. | 708/491 |
| 5,659,700 A * | 8/1997 | Chen et al. | 711/217 |
| 5,918,252 A * | 6/1999 | Chen et al. | 711/217 |
| 6,003,099 A * | 12/1999 | Hintukainen | 710/52 |
| 6,397,318 B1 * | 5/2002 | Peh | 711/220 |
| 6,560,691 B2 * | 5/2003 | Chen | 711/219 |
| 2002/0194452 A1 * | 12/2002 | Catherwood | 711/220 |

* cited by examiner

Primary Examiner—Jack A. Lane
Assistant Examiner—Jasmine Song
(74) Attorney, Agent, or Firm—Mark A. Haynes; Haynes Beffel & Wolfeld LLP (57) ABSTRACT

An apparatus generates addresses for circular address buffers in a memory, in which a higher boundary of a circular buffer is implied from the current address. This approach is applied alone, and in combination with circular buffers which rely on an implied lower boundary to improve memory usage and flexibility in the design of circular buffers for integrated circuits. The dual mode address generator comprises inputs that receive a current address A, an address offset M, a buffer length L and a control signal; and logic configured to compute a first memory address for a buffer with an implied lower boundary and a second memory address for a buffer with an implied higher boundary in response to A, M, and L. One of the first and second memory addresses is provided in response to the control signal. The first memory address corresponds the current address A plus the address offset M for a first circular buffer having an implied lower address boundary X and including addresses X through (X+L); and the second memory address corresponds the current address A plus the address offset M for a second circular buffer having an implied higher address boundary Y and comprising addresses Y through (Y−L).

24 Claims, 6 Drawing Sheets

METHOD AND SYSTEM FOR CIRCULAR ADDRESSING WITH EFFICIENT MEMORY USAGE

BACKGROUND OF THE INVENTION

1. Field of the Invention

The present invention relates to memory addressing, and more particularly to addressing for circular buffers used in digital systems, like digital signal processors.

2. Description of Related Art

Circular addressing, also called modulo addressing, is commonly used in digital signal processing and other data processing applications. In a circular buffer for which circular addressing is applied, an address extent is assigned to the buffer. In generating addresses for the circular buffer, a current address is incremented by an offset value to produce a next address. If the sum of the current address and the offset value points to an address outside of the assigned address extent, then the next address wraps around to the opposite boundary of the circular buffer.

Various approaches to generating addresses for circular buffers have been applied in prior art. One common way to accomplish circular addressing is to define two explicit parameters that set the upper and lower boundaries of the assigned address extent. In this way, the user has flexibility to define a buffer with an unlimited position in the available memory. However, this approach requires registers to store the boundaries and relatively complicated logic to calculate the next address. As address generation can be in the critical path of a particular design, it is desirable to reduce the number of parameters required and to simplify the logic.

Another approach for generating addresses for circular buffers is described in U.S. Pat. No. 4,800,524, invented by Roesgen. In the approach of the Roesgen patent, the buffer is defined by a single buffer length parameter and a current address for the circular buffer. The lower boundary of the circular buffer is implied from the current address and the buffer length by substituting the lower N bits of the current address with zeros, where "N" is the bit position of the leading (left most) 1 in the binary representation of the buffer length. The upper boundary of the circular buffer is defined as the implied lower boundary plus the buffer length. This approach is simpler to implement than the approach requiring explicit parameters that set the upper and lower boundaries. However, memory usage is not as efficient, because of the limited set of boundaries available.

Other approaches in the prior art for circular address generation are described in U.S. Pat. No. 4,202,035, invented by Lane; U.S. Pat. No. 4,809,156, invented by Taber; U.S. Pat. No. 5,249,148, invented by Catherwood, et al.; and U.S. Pat. No. 5,381,360, invented by Shridhar, et al.

As the complexity of digital signal processing applications which rely on circular addressing has grown, the need for improving the flexibility and reducing the cost of address generators for such applications is growing.

SUMMARY OF THE INVENTION

The present invention provides an apparatus that generates addresses for circular address buffers in a memory, in which a higher boundary of a circular buffer is implied from the current address. This approach can be applied alone, and in combination with circular buffers which rely on an implied lower boundary to improve memory usage and flexibility in the design of circular buffers for integrated circuits and processing systems.

One embodiment of an address generator according to the present invention comprises inputs that receive a current address A, an address offset M, a buffer length L and a control signal; and logic configured to compute a first memory address and a second memory address for locations in the memory in response to A, M, and L. One of the first and second memory addresses is provided in response to the control signal. The first memory address corresponds the current address A plus the address offset M for a first circular buffer having an implied lower address boundary X and including addresses X through (X+L). The second memory address corresponds the current address A plus the address offset M for a second circular buffer having an implied higher address boundary Y and comprising addresses Y through (Y−L).

The buffer length, L, is value that when expressed in binary has a leading 1 at bit position N. The implied lower address boundary X is computed by replacing the lower N bits of current address A with 0's. The implied higher address boundary Y is computed by replacing the lower N bits of current address A with 1's.

In various embodiments, said inputs include registers storing A, M and L. The control signal can also be stored in a register, or stored within the register which is shared with one of the other parameters, such as the offset value M.

In one embodiment, the logic used by the address generator includes a first adder to produce a s first output equal to a sum A+M with a carry out signal; and a second adder to produce a second output equal to a first wrap address sum (A+M)−(L+1) when the sign of M is positive or a second wrap address sum (A+M)+(L+1) when the sign of M is negative, with a carry out signal. Select logic selects the first output or the second output in response to the carry out signals from the first and second adders. The first and second adders are shared logic, used for circular buffers with the implied lower address boundary and for circular buffers with the implied higher address boundary, in one preferred embodiment.

In yet other embodiments, where L has a leading 1 at bit position N, the implied lower address boundary X is computed by replacing the lower N bits of current address A with 0's, and the implied higher address boundary Y is computed by replacing the lower N bits of current address A with 1's. The first and second adders produce carry out signals for multiple bit positions, and a selector is responsive to L to provide the carry out from the Nth bit position in the adder for use by the logic. Thus, in this embodiment the select logic is operable to select the first output or the second output in response to the carry out signals from the Nth bit position in the first and second adders.

For embodiments in which both the implied lower address boundary and implied higher address boundary circular buffers are used, the select logic is configured:

to select the output of the first adder
if control signal is set for the first memory address, the address offset is positive, and the carry out from neither the first adder nor the second adder is 1, or
if control signal is set for the first memory address, the address offset is negative, and the carry out from the first adder is 1, or
if the control signal is set for the second memory address, the address offset is positive, and the carry out from the first adder is 0, or
if the control signal is set for the second memory address, the address offset is negative, and the carry outs from both the first adder and the second adder are 1; and to select the output of the second adder
- if the control signal is set for the first memory address, the address offset is positive, and the carry out from at least one of the first adder or the second adder is 1, or
- if the control signal is set for the first memory address, the address offset is negative, and the carry out from the first adder is 0, or
- if the control signal is set for the second memory address, the address offset is positive, and the carry out from the first adder is 1, or
- if the control signal is set for the second memory address, the address offset is negative, and the carry out from at least one of the first adder or the second adder is 0.

For embodiments in which only the implied higher address boundary is used, the select logic is configured:
to select the output of the first adder
- if the address offset is positive, and the carry out from the first adder is 0, or
- if the address offset is negative, and the carry outs from both the first adder and the second adder are 1; and to select the output of the second adder
- if the address offset is positive, and the carry out from the first adder is 1, or
- if the address offset is negative, and the carry out from at least one of the first adder or the second adder is 0.

The present invention is also embodied by an integrated circuit that includes a processor core, register files that store in the current address A, offset value M and buffer length L, memory and address generators for the memory. In embodiments according to the present invention the address generator is configured to use only the implied higher address boundary, or to use a combination of the implied higher address boundary and implied lower address boundary, as described above.

Other aspects and advantages of the present invention are described below with reference to the figures.

DETAILED DESCRIPTION

A detailed description of embodiments of the present invention is provided with respect to FIGS. 1–6.

Figure 1:
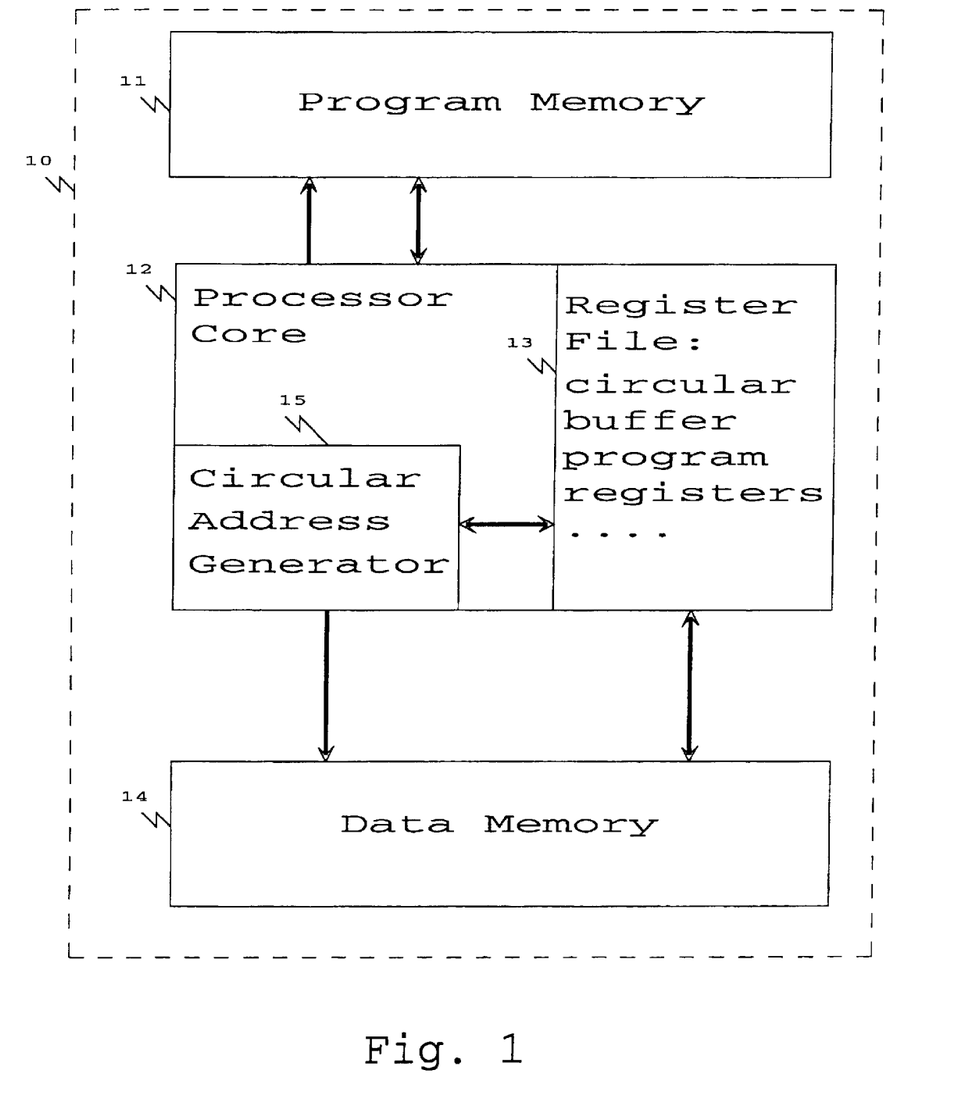
FIG. 1 is a simplified block diagram of an integrated circuit processor with the high/low circular address generator of the present invention.

In FIG. 1, a simplified diagram of an integrated circuit processor which includes the address generator of present invention is provided. Thus, an integrated circuit device 10 includes a program memory 11, a data memory 14, and a processor core 12, such as a processor core including a circular address generator 15 for data memory access, a register file 13 in which circular buffer program registers reside in, and other logic such as instruction decoder, ALU etc. The circular address generator 15 according to the present invention provides management for buffers in data memory 14 with a length (L+1) and a selectable boundary base, which can be based on an implied higher boundary, or based on a combination implied higher boundary or an implied lower boundary.

For example, the processor 12 executes instructions from the program memory 11. Instructions include direct address instructions and indirect address instructions. The indirect address instructions rely on the circular buffer program registers in the register file 13. In one embodiment, there are four sets of circular buffer program registers, each of which includes a first register that stores a current address A, a second register that stores an offset value M, and a third register that stores a buffer length value L. For the embodiment that supports both higher and lower address boundaries, a high/low control signal is provided which indicates, for each access, whether the higher or lower address boundary buffer is to be used. The high/low control signal may be provided independently, as part of an instruction which uses the circular addressing, or as a high bit in the register which stores the offset value M, as the offset value M is limited to values that use only the lower order bits in the register.

For example, an instruction "ldx1,ar2,m2" is interpreted by a decoder in the processor core 12 to load memory data into a register x1 of the register file. The memory data is retrieved from the address specified by register ar2 in a set of circular buffer program registers storing the current address A as incremented by the offset value M stored in the register m2 in the set of circular buffer program registers. The register 12 in the set of second buffer program registers which stores the buffer length value L is pre-configured by the processor, or otherwise. In one embodiment, if the buffer length value L for a 16-bit address is set to hex ffff, then linear addressing is used in response to the indirect address instructions that specify registers in the corresponding set of circular buffer program registers.

Figure 2A:
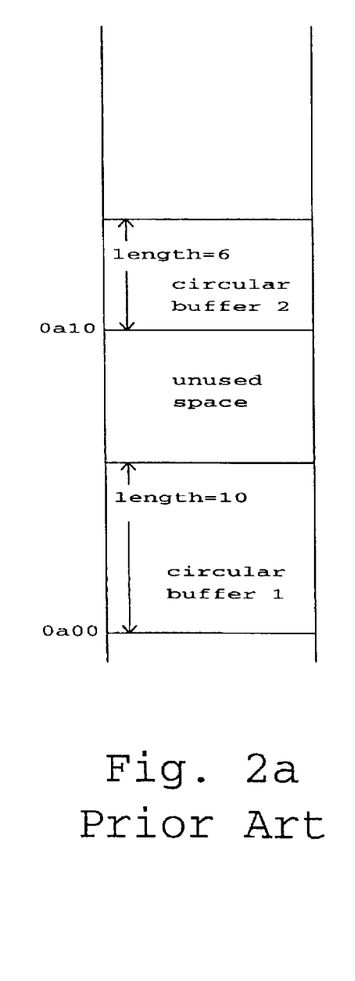
FIGS. 2a, 2b, and 2c respectively illustrate address ranges for the prior art implied lower address boundary circular buffer, address ranges for an implied higher address boundary circular buffer embodiment of the present invention, and address ranges for a combined high address boundary and low address boundary embodiment of the present invention.
Figure 2B:
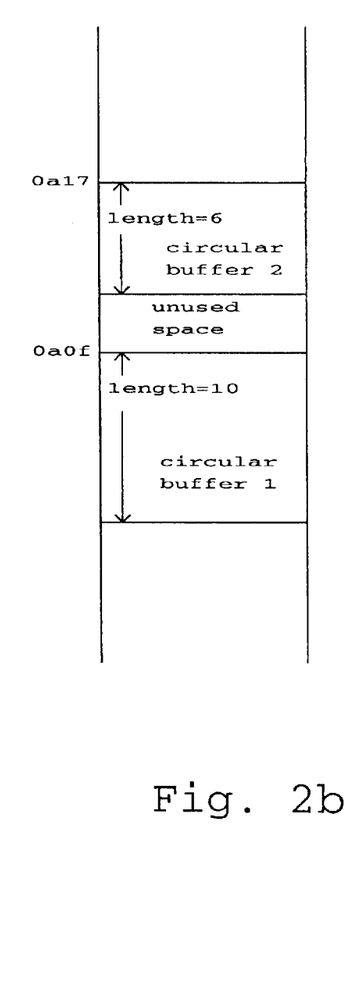
Figure 2C:
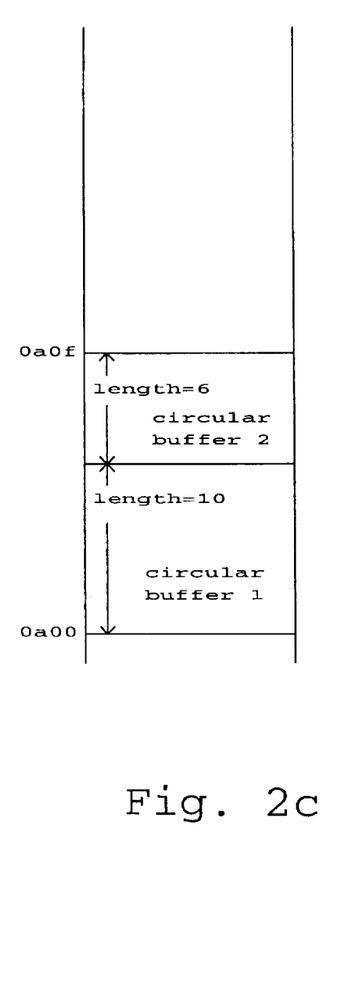

FIGS. 2a–2c illustrate circular addressing using the implied lower address boundary, implied higher address boundary, and combined lower and higher address boundary embodiments. In FIG. 2a, the prior art implied lower address boundary approach is shown with circular buffer 1 and circular buffer 2. In this example, circular buffer 1 has a length L+1 equal to 10, and its allocation is between 0a00 (hex) and 0a09 (hex). Assume there is a circular buffer 2 having a length L+1 equal to 6 that a user wants to define. Although the length of the address set between 0a0a(hex) and 0a0f (hex) is equal to 6, this address set cannot be used for circular buffer 2, because it must have an implied lower boundary in which the lower 3 are zeros. So we locate circular buffer 2 between 0a10 (hex) and 0a15 (hex), this leaves an unused space between 0a0a(hex) and 0a0f (hex).

FIG. 2b illustrates the implied higher address boundary approach of the present invention. The circular buffer 1 and the circular buffer 2 are shown. In this case, the higher address boundary is implied. Thus for circular buffer 1 with a length L+1 equal to 10, and with allocation between 0a0f (hex) and 0a06 (hex). In this example, the user defines circular buffer 2 has a length L=1 equal to 6. The most compact and closest allocation to buffer 1, locates buffer 2 between 0a17 (hex) and 0a12 (hex) by implied higher boundary base. This still leaves an unused space between buffer 1 and buffer 2.

FIG. 2c illustrates circular buffer 1 with an implied lower address boundary, and circular buffer 2 with an implied higher address boundary, configured said there is no unused space between them. In this example, circular buffer 1 has a length L+1 equal to 10. For a current address A between 0a00 (hex) and 0a09 (hex), the circular address generator produces the next address within the range 0a00 (hex) to 0a09 (hex). Circular buffer 2 with a length L+1 equal to 6 in this example has an implied higher address boundary 0a0f (hex). For an access to the circular buffer 2, using a current address between 0a0f (hex) and 0a0 a(hex), the circular address generator produces the next address within the range 0a0f (hex) to 0a0 a(hex). As can be seen, the two circular buffers can be configured so there is no unused space between them.

The address generation logic for a buffer with an implied lower address boundary and for a buffer with implied higher address boundary are described below with reference to FIGS. 3 and 4.

If the buffer is selected with an implied lower boundary, then the implied lower boundary is determined by inserting 0s in the lower N bits of the current address A, where the value N is the bit position of the first leading "1" of the buffer length parameter L. The value N also could be declared by the equation of $2^{(N-1)}<=L<2^N$. According to this technique, the lower boundary can located at any multiple of $2^N$. The lower boundary of this buffer is specified by the higher W–N bits of A at left concatenated with 0s in the lower N bits at right, where W is the number of address bits used for the memory. Once a lower boundary is determined, the higher boundary is determined by adding L to lower boundary for buffer of length L+1. That is, the higher boundary is specified by the higher W–N bits of A at the left concatenated with the lower N bits of L at right.

For example: consider a case in which W=16, L is 0000 0000 0010 1011 (16 bits in binary), and the current address A to this buffer is 0011 1001 0101 1110. The leading 1 in L is at bit position 6, so we have N=6. The implicit lower boundary is 0011 1001 0100 0000, and the implicit higher boundary is 0011 1001 0110 1011.

For ease of description, we take the higher W–N bits out of A, higher boundary and lower boundary, and use I to represent the lower N bits of A, use 0 to represent lower boundary, and use L to represent higher boundary. M is an offset between current address I and target next address I. M is a signed number, and could be a positive number or a negative number.

In case M is a positive number, there are three conditions: (1) $I+M>=2^N$, (2) I+M>=L+1, and (3) I+M<L+1, for consideration in connection with the logic used by the circular address generator.

In condition 1 with M positive, $I+M>=2^N$. The absolute address (I+M) exceeds the higher boundary L. The next address needs to be wrapped to the lower area of the circular buffer. The target next address I can be calculated by deducting buffer length (L+1) from the absolute address (I+M). The equation is I+M−(L+1), which for a 2's complement system is converted to I+M+(L\).

In condition 2 with M positive, I+M>=L+1. The absolute address (I+M) also exceeds the higher boundary L. The next address needs to be wrapped to the lower area of the buffer. The target next address I can be calculated by deducting buffer length from the absolute address. The equation is the same as in condition 1, I+M−(L+1), which for a 2's complement system is equal to I+M+(L\).

In condition 3 with M positive, I+M <L+1. The absolute address I+M does not exceed the higher boundary L. So the target next address I is equal to I+M.

In a hardware implementation, the condition 1 (I+M>= $2^N$) is indicated by a carry out generated from I+M, and the condition 2 (I+M>=L+1) is indicated by a carry out generated from I+M+(L\). The condition 3 is indicated if there is no carry out generated from I+M.

In case M is a negative number, there are two conditions: (1) I+M<0, (2) I+M>=0, for consideration in connection with the logic used by the circular address generator.

In condition 1 with M negative, I+M <0. The absolute address (I+M) is a negative number below the lower boundary 0 of the circular buffer. The next address needs to be wrapped to the higher area of the circular buffer. The target next address I can be calculated by adding buffer length L+1 to the absolute address I+M, the equation is: I+M+L+1.

In condition 2 with M negative, I+M>=0. The absolute address (I+M) lies above the lower boundary 0, so the target I is equal to I+M.

In the hardware implementation, condition 1 with M negative (I+M<0) is indicated by no carry out generated from I+M. Condition 2 with M negative (I+M>=0) is indicated by a carry out generated from I+M.

Figure 3:
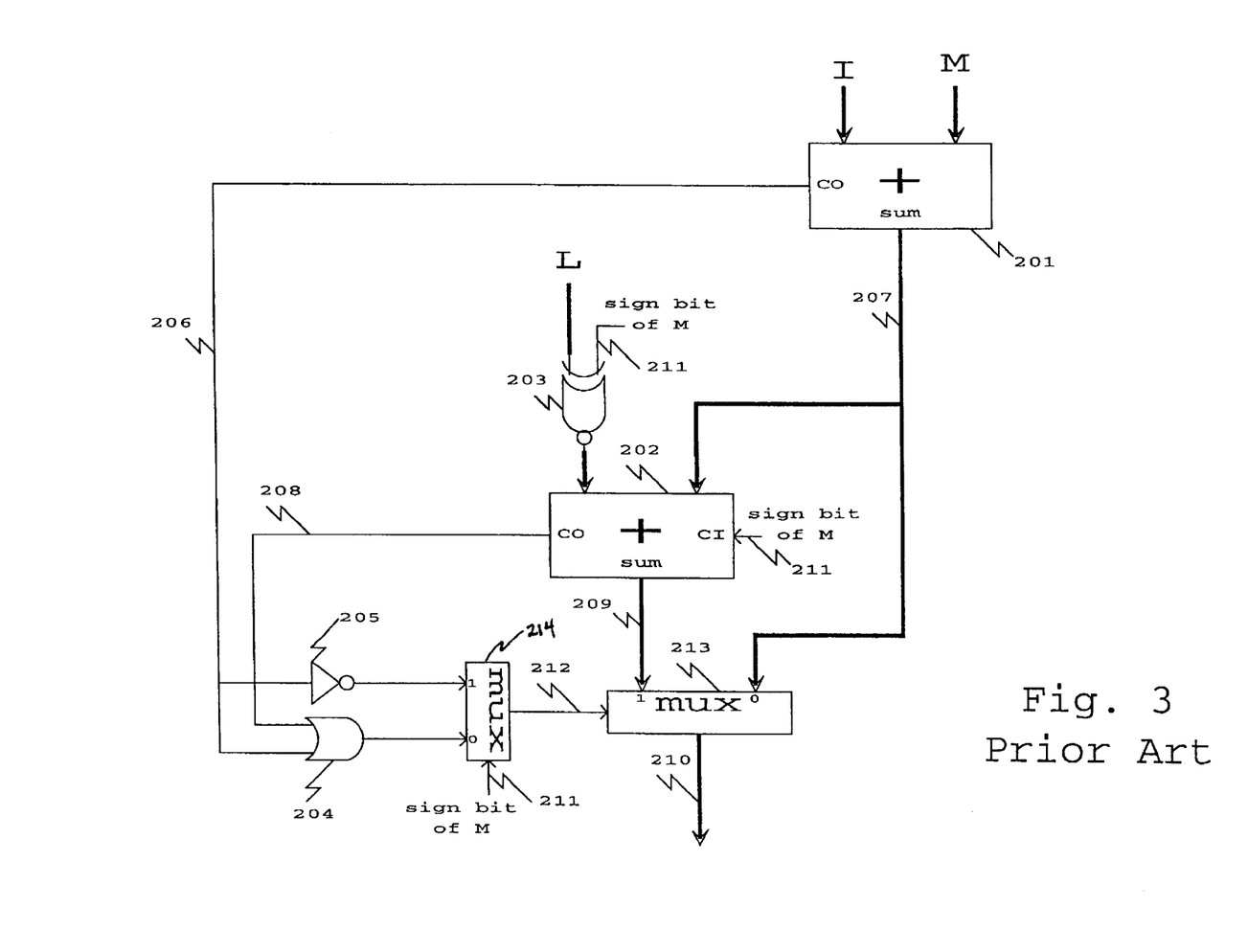
FIG. 3 is a simplified logic diagram for address calculation according to the implied lower address boundary circular addressing of the prior art.

Thus, a hardware implementation of an implied lower address boundary circular buffer is implemented logically as shown in FIG. 3. The logic in FIG. 3 includes a first adder 201 and a second adder 202. The inputs to the first adder 201 include the values I and M. The output of the first adder 201, referred to herein as the absolute address, is provided on line 207, and equals I+M. A carry out signal from the adder 201 is supplied on line 206. The inputs to the second adder 202 include the output of the exclusive NOR gate 203 and the output on line 207 of the first adder 201. The inputs to the exclusive NOR gate 203 include the length value L and a sign bit of a address offset M. The second adder 202 receives the sign bit of M as a carry in on line 211. The output of the second adder 202, referred to herein as the wrapped address, is supplied on line 209. A multiplexer 213 receives the absolute address on line 207, and the wrapped address on line 209 as inputs, and supplies the target next address on line 210. A control signal is supplied to the multiplexer 213 on line 212 to indicate which of the computed absolute address and wrapped address is provided as the output. The signal line 212 is provided by the output of the multiplexer 214, which acts in response to the sign bit of M on line 211, to select logic for the case in which the sign bit of M is one (M is negative), and the case in which the sign bit of M is zero (M is positive).

In the case in which the sign bit of M is one, the output of the inverter 205 is provided as the control signal on line 212. The input of the inverter 205 is the carry out signal on line 206 from the first adder 201. Thus, if the sign bit of M is one, the wrapped address is selected if the carry out of the first adder 201 is zero, and the absolute address is selected if the carry out of the first adder 201 is one.

In the case in which the sign bit of M is zero, the output of the OR gate 204 is provided as the control signal on line 212. The inputs of the OR gate 204 include the carry out signal on line 208 from the second adder 202, and the carry out signal on line 206 from the first adder 201. Thus, if the sign bit of M is zero, the wrapped address is selected if at least one of the carry out signals on lines 206 and 208 is one. If the sign bit of M is zero, the absolute address is selected if both of the carry out signals on lines 206 and 208 are 0.

If the buffer is selected with an implied higher boundary, then the implied higher boundary is determined by concatenating 1s in the lower N bits of the current address A, where N is the bit position of the first leading "1" of the length parameter L. N may also be determined by the equation of $2^{(N-1)} <= L < 2^N$. In other words, the higher boundary can be located at (any multiple of $2^N$)+($2^N$−1). An address A including W bits, to this buffer can the used to locate higher and lower boundaries of the buffer. The higher boundary of this buffer is specified as the higher W−N bits of A at left concatenated with 1s in the lower N bits at right. Once the higher boundary is determined, the lower boundary is determined by deducting L from higher boundary. Thus, the lower boundary is specified by the higher W−N bits of A at left concatenated with the lower N bits of (L\) at right. Here L\ is 1's complement of L.

For example, consider the case in which W=16, L is 0000 0000 0010 1011 (16 bits in binary), and the current address to this buffer is 0011 1001 0101 1110. Then we will have N=6, and the implicit higher boundary is 0011 1001 0111 1111, and the implicit lower boundary is 0011 1001 0101 0100.

As above for ease of description, we take the higher W−N bits out of A, the higher boundary and the lower boundary, and use I to represent the lower N bits of A, use F to represent higher boundary, and use (L\) to represent lower boundary. M is an offset between current I and target I. M is a signed number, and could be positive or negative.

In case M is a positive number, there are two cases: (1) I+M>=F+1 and (2) I+M <F+1, for consideration in connection with the logic used by the circular address generator.

In condition 1 with M positive, (I+M>=F+1). The absolute address (I+M) exceeds the higher boundary (F, all 1s), and the next address needs to be wrapped to the lower area of buffer. The target (wrapped) address I can be calculated by deducting absolute address with buffer length. The equation is I+M−(L+1), for a 2's complement system I+M−(L+1) is equal to I+M+(L\).

In condition 2 with M positive, (I+M<F+1). The absolute address I+M does not exceed the higher boundary F. In this case, the target address I is equal to I+M.

In a hardware implementation, condition 1 (I+M>=F+1) is indicated by a carry out generated from I+M. Condition 2 (I+M <F+1) is indicated by no carry out generated from I+M.

In case M is a negative number, there are three cases: (1) I+M<0, (2) I+M<(L\) and (3)I+M>=(L\), for consideration in connection with the logic used by the circular address generator.

In condition 1 with M negative, I+M<0. The absolute address (I+M) is a negative number and lies below the lower boundary (L\) of the circular buffer. Thus, the target next address needs to be wrapped to the higher area of buffer. The target (wrapped) next address I is calculated by adding buffer length to the absolute address, so the equation is: I+M+L+1.

In condition 2 with M negative, I+M<(L\). The absolute address also lies below the lower boundary (L\) of the circular buffer. Therefore the target (wrapped) next address I will be I+M+L+1.

In condition 3 with M negative, I+M>=(L\). The absolute address (I+M) does not extend below the lower boundary (L\). Therefore, the target I is equal to I+M.

For a hardware implementation, condition 1 with M negative (I+M<0) can be indicated by no carry out generated from I+M. Condition 2 with M negative (I+M<(L\)) can be indicated by no carry out generated from I+M+L+1.

Figure 4:
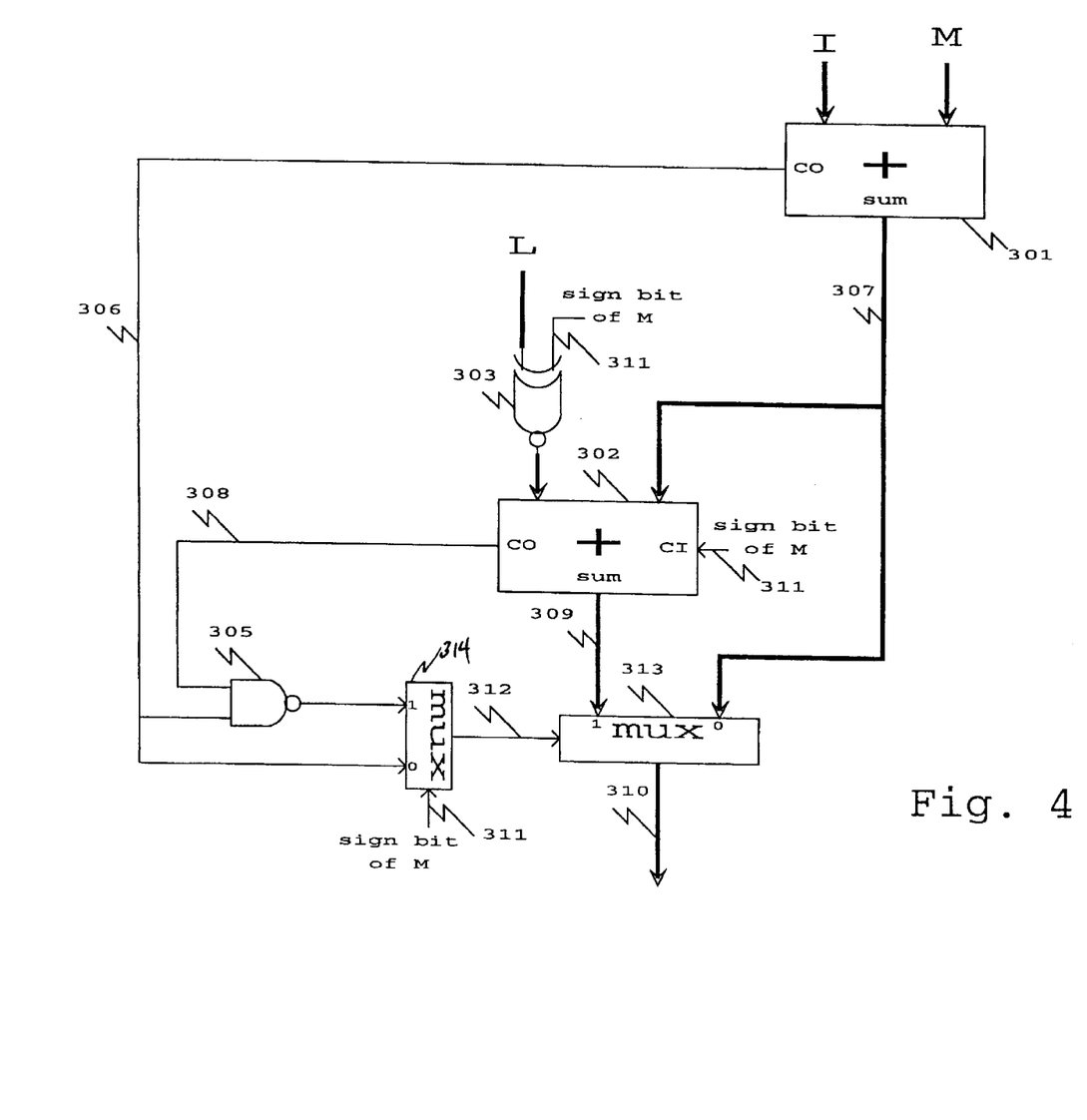
FIG. 4 is a simplified logic diagram for address calculation according to the implied higher address boundary circular addressing embodiment of the present invention.

Thus, a hardware implementation of an implied higher address boundary circular buffer is implemented logically as shown in FIG. 4. The logic in FIG. 4 includes a first adder 301 and a second adder 302. The inputs to the first adder 301 include the values I and M. The output of the first adder 301, referred to herein as the absolute address, is provided on line 307, and equals I+M. A carry out signal from the first adder 301 is supplied on line 306. The inputs to the second adder 302 include the output of the exclusive NOR gate 303 and the output on line 307 of the first adder 301. The inputs to the exclusive NOR gate 303 include the length value L and a sign bit of the address offset M. The second adder 302 receives the sign bit of M as a carry in on line 311. The output of the second adder 302, referred to herein as the wrapped address, is supplied on line 309. A multiplexer 313 receives the absolute address on line 307, and the wrapped address on line 309 as inputs, and supplies the target next address on line 310. A control signal is supplied to the multiplexer 313 on line 312 to indicate which of the computed absolute address and wrapped address is provided as the output. The signal on line 312 is provided by the output of the multiplexer 314, which acts in response to the sign bit of M on line 311, to select logic for the case in which the sign bit of M is one (M is negative), and the case in which the sign bit of M is zero (M is positive).

In the case in which the sign bit of M is one, the output of the NAND gate 305 is provided as the control signal on line 312. The inputs of the NAND gate 305 include the carry out signal on line 306 from the first adder 301 and the carry out signal on line 308 from the second adder 302. Thus, if the sign bit of M is one, the wrapped address is selected if the carry out of at least one of the first adder 301 and the second adder 302 is zero, and the absolute address is selected if the both of the carry outs of the first adder 301 and a second adder 302 are one.

In the case in which the sign bit of M is zero, the carry out on line 306 of the first adder 301 is provided as the control signal on line 312. Thus, if the sign bit of M is zero, the wrapped address is selected if the carry out signal on line 306 is one. If the sign bit of M is zero, the absolute address is selected if the carry out signal on line 306 is zero.

Figure 5:
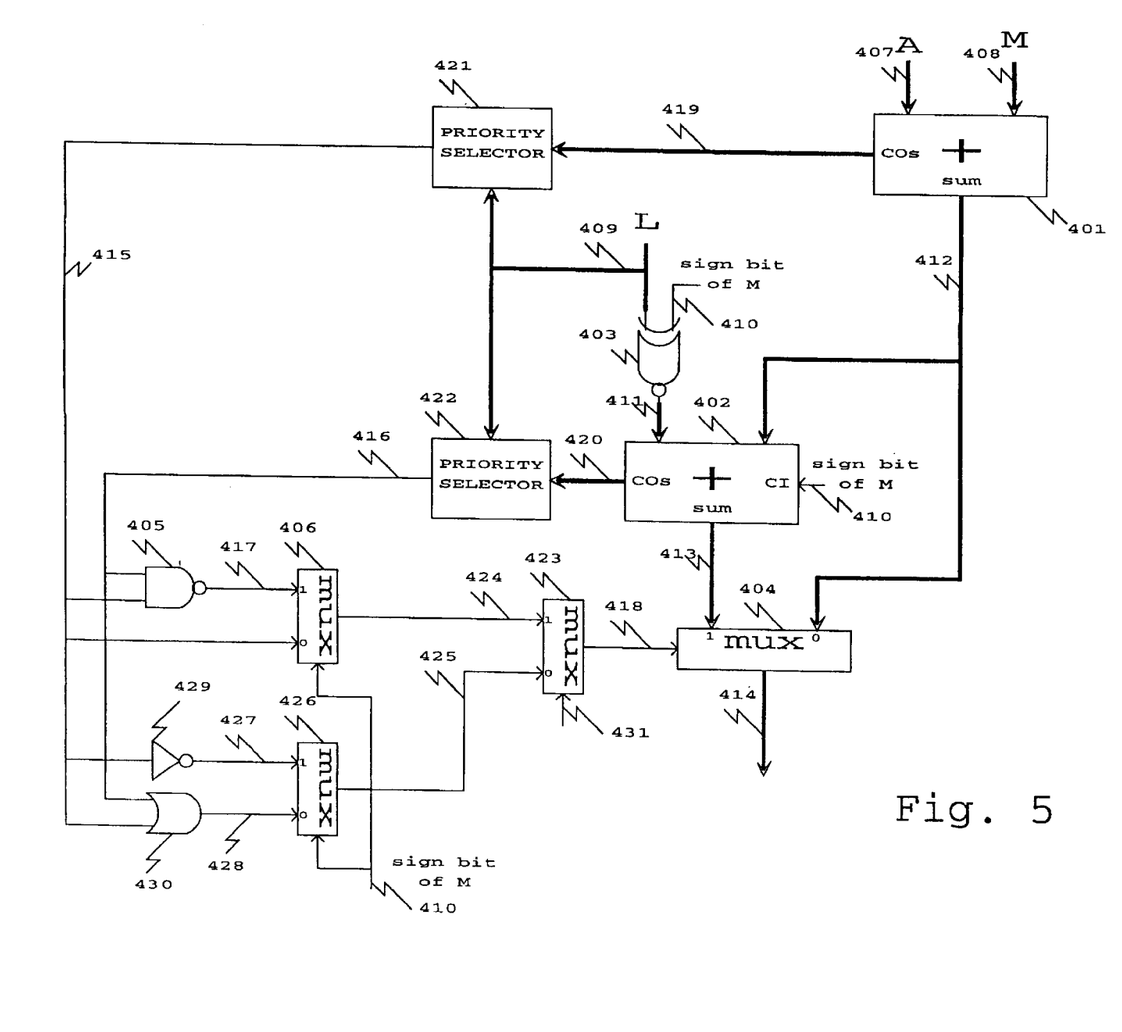
FIG. 5 is a logic diagram for address calculation according to a combined implied lower address boundary and implied higher address boundary circular addressing embodiment of the present invention.

FIG. 5 shows a block diagram of one of possible embodiment, in which the two adders 401, 402 are shared by the lower boundary scheme and the higher boundary scheme. For this apparatus there are four inputs and one output:

The inputs are:
1. Buffer length L 409, which is a programmed value (actual buffer length is L+1).
2. Current access address A 407, boundaries of the circular buffers are implicit in A and L.
3. An offset M 408 between current address 407 and target address 414. M is a signed value. The absolute value of M is not greater than L.
4. A programmable control signal on line 431 that is used to select whether the buffer based on an implied lower boundary or an implied higher boundary is to be used.

The output is:
1. Target next address 414, which will be used as current address 407 for subsequent address generation.

Adder 401 performs an addition of A 407 and M 408, and generates the sum 412—an absolute address, and generates the carry-outs 419 from each bit weight. XNOR 403 is used to take an inversion of L 409 if sign bit 410 of M 408 is equal to 0. If the sign bit 410 of M 408 is equal to 1, then the output 411 of XNOR 403 is equal to L 409. Adder 402 performs an addition of the absolute address 412 and the output 411 of XNOR 403, plus a carry-in equal to the sign bit 410 of M 408 at the least significant bit, and generates the sum 413—a wrapped address and the carry-outs 420 from each bit weight. The target address 414 is selected from the absolute address 412 or the wrapped address 413 though multiplexer 414 by control signal 418. Priority selector 421 selects the Nth-bit carry-out from the carry-outs 419 of adder 401 by detection of the leading "1" in L 409 as an output 415. Priority selector 422 selects the Nth bit carry-out from the carry-outs 420 of adder 402 in response to L 409 as an output 416. The wire 431 is used to select one of two inputs of multiplexer 423, if wire 431 is equal to 0, then the control signal 418 comes from wire 425. This also means the buffer is defined as a lower boundary based. Otherwise wire 424 is selected, and the buffer is based on higher boundary.

If wire 431 is 0, then this buffer is lower boundary based. While M is a positive number, the wire 428 is selected as the control signal 418 through multiplexer 426, wire 425 and multiplexer 423. If at least one of carry out 415 generated from adder 401 through priority selector 421 or carry out 416 generated from adder 402 through priority selector 422 is set, the sum 413 (wrapped address) of adder 402 will be selected as target address 414 through the multiplexer 404. The OR function is performed by the OR gate 430. The wire 428 is the output of OR gate 430 and also is the input of multiplexer 426. While M is a negative number, the wire 427 is selected as the control signal 418 through multiplexer 426, wire 425 and multiplexer 423. If the carry out 415 generated from adder 401 through priority selector 421 is clear, the sum 413 (wrapped address) of adder 402 will be selected as target address 414. The inverter 429 is used to recognize the clear status of wire 415, and the wire 427 is the output of inverter 429.

If wire 431 is set to 1, then this buffer is higher boundary based. While M is a positive number, the wire 415 is selected as the control signal 418 through multiplexer 406, wire 424 and multiplexer 423. If the carry out 415 generated from adder 401 through priority selector 421 is set, the sum 413 (wrapped address) of adder 402 will be selected as target next address 414 with the multiplexer 404, else the absolute address generated from adder 402 will be selected. While M is a negative number, the wire 417 is selected as the control signal 418 through multiplexer 406, wire 424 and multiplexer 423. If at least one of the carry out 415 generated from adder 401 through priority selector 421 or the carry out 416 generated from adder 402 through priority selector 422 is cleared, the sum 413 (wrapped address) of adder 402 will be selected as the target next address 414 with the multiplexer 404, else the absolute address is selected. The OR function is performed by the NAND gate 405. The wire 417 is the output of NAND gate 405 and the input of multiplexer 406.

Figure 6:
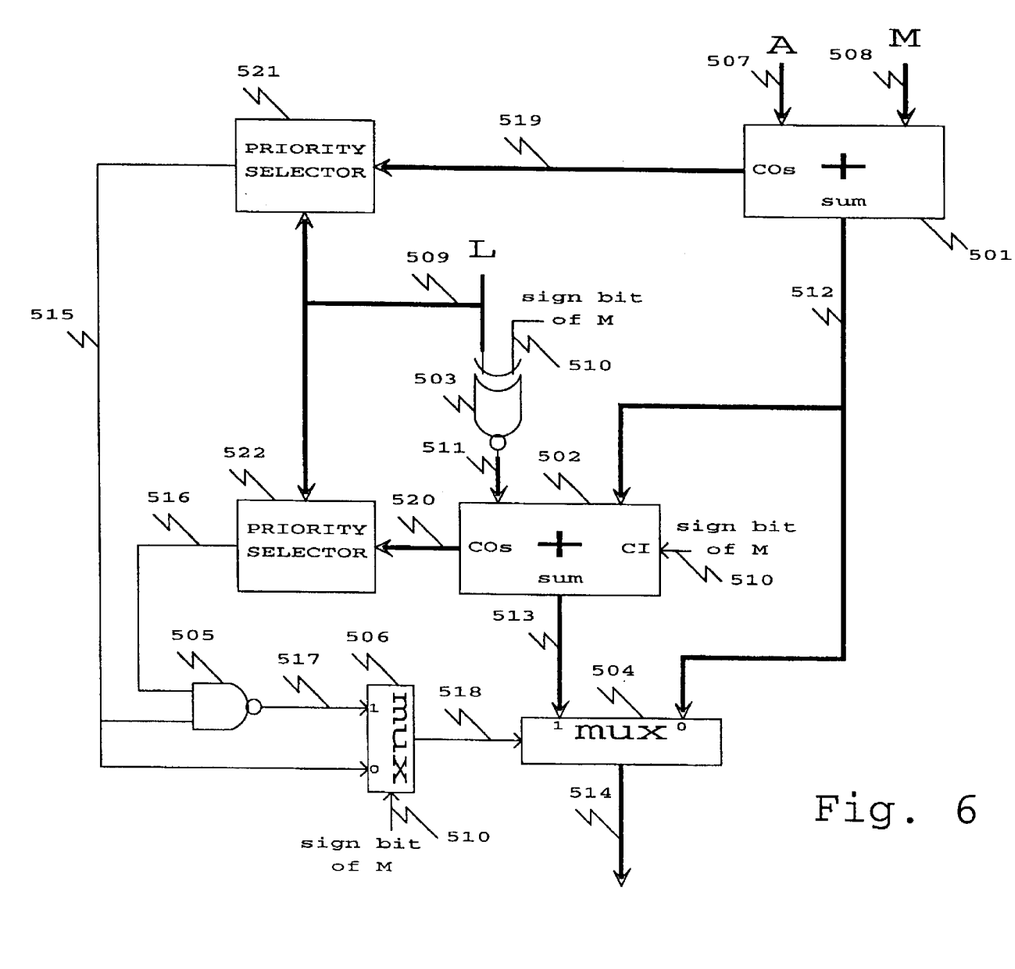
FIG. 6 is a logic diagram for address calculation according to the implied higher address boundary circular addressing embodiment of the present invention, illustrating the priority selector block by which the carry out at position N is selected.

In some embodiments of the invention, the implied higher boundary scheme is used alone, as shown in FIG. 6.

In FIG. 6, adder 501 performs A 507+M 508 and generates an absolute address 512. If M 508 is a positive number (the sign bit 510 of M is equal to 0), then XNOR gate 503 takes inversion of L 519. If M 508 is a negative number (the sign bit 510 of M is equal to 1), then the output 511 of XNOR 503 is equal to L 519. Adder 502 performs an addition with the absolute address 512 and the output 511 of XNOR 503, plus a carry-in equal to the sign bit 510 of M, in the least significant bit. Output 513 of adder 502 is the wrapped address, which is selected if the absolute address exceeds the boundary of the buffer. The target output 514 is selected from absolute address 512 or wrapped address 513 though a multiplexer 504 by control signal 518.

In case M is positive, the signal 515 is selected as the control signal 518 by multiplexer 506. Priority selector 521 selects the Nth-bit carry-out as output 515 from the carry-outs 519 of adder 501 by detection of the leading "1" of L 509. The output 515 of priority selector 521 represents the Nth-bit carry-out status of Adder 501. "1" at Nth carry-out from adder 501 means the absolute address (A+M) exceeds the higher boundary of buffer, and the wrapped address 513 will be selected as the output 514. Otherwise the absolute address 512 is selected as output 514.

In case M is negative, the signal 517 is selected as the control signal 518 from multiplexer 506. In this case, there are two 515, 516 Nth bit carry out signals used. Lines 515 and 516 are supplied to NAND gate 505, which provides a signal 517 as output. A "0" value of signal 515 indicates no carry-out generated by A+M, which means the absolute address 512 has a negative value and is below the lower boundary of the buffer. Thus the wrapped address 513 is taken as the target next address output 514. Priority selector 522 selects the Nth bit carry-out as an output 516 from the carry-outs 520 of adder 502 by detection of the leading "1" of L 509. A "0" value of signal 516 indicates no carry-out generated by adder 502,which means A+M<(L\), and the absolute address is below the lower boundary of the buffer. In this case, the wrapped address 513 is selected as the target next address output 514. If the two wrapped conditions are not met, then the absolute address 512 is selected as target next address output 514.

In summary, an address generator for generating addresses to access a circular buffer in a linear memory space is provided. This buffer has a programmed length (L+1), with the buffer base defined with an implied lower boundary or an implied higher boundary. If the implied lower boundary is used to define the circular buffer, then its lower boundary will be an address in which lower N bits are all 0s, where N is the bit position of first leading 1 of L. If the implied higher boundary is used to define the circular buffer, then its higher boundary will an address in which lower N bits are all 1s. An absolute address is calculated by adding an offset M to a current address A, where M is a signed number, and the absolute value of M is not greater than L. If the absolute address exceeds the boundary of the buffer, it will wrap to another side of the boundary by adding or deducting the buffer length (L+1). In this way the target next address is always located inside the buffer. Such address generator is used for digital signal processing applications, as well as other applications in data processing.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus generating addresses for circular address buffers in a memory, comprising:
   inputs that receive a current address A, an address offset M, a buffer length value L and a control signal identifying a first circular buffer having address boundary X and including addresses X through (X+L) or a second circular buffer having address boundary Y and comprising addresses Y through (Y−L); and logic configured to compute a memory address for locations in the memory in response to A, M, and L, and in response to the control signal, wherein the memory address corresponds to the current address A plus the address offset M within the first circular buffer if the control signal identifies the first circular buffer and the memory address corresponds to the current address A plus the address offset M within the second circular buffer if the control signal identifies the second circular buffer.

2. The apparatus of claim 1, wherein L is a value that when expressed in binary has a leading 1 at bit position N, and the address boundary X is computed by replacing the lower N bits of current address A with 0's, and the address boundary Y is computed by replacing the lower N bits of current address A with 1's.

3. The apparatus of claim 1, wherein said inputs include registers storing A, M and L.

4. The apparatus of claim 1, wherein said inputs include registers storing A, M, L and the control signal.

5. The apparatus of claim 1, wherein said logic includes:
a first adder to produce a first output equal to a sum A+M with a carry out signal;
a second adder to produce a second output equal to a first wrap address sum (A+M)−(L+1) when the sign of M is positive or a second wrap address sum (A+M)+(L+1) when the sign of M is negative, with a carry out signal; and
select logic to select the first output or the second output in response to the carry out signals from the first and second adders.

6. The apparatus of claim 1, wherein L is a value that when expressed in binary has a leading 1 at bit position N, and the address boundary X is computed by replacing the lower N bits of current address A with 0's, and the address boundary Y is computed by replacing the lower N bits of current address A with 1's, and said logic includes:
a first adder to produce a first output equal to a sum A+M with a carry out signal at bit position N;
a second adder to produce a second output equal to a first wrap address sum (A+M)−(L+1) when the sign of M is positive or a second wrap address sum (A+M)+(L+1) when the sign of M is negative, with a carry out signal at bit position N; and
select logic to select the first output or the second output in response to the carry out signals from the first and second adders, and in response to the control signal.

7. The apparatus of claim 6, wherein said select logic is configured:
to select the output of the first adder
if control signal is set for the first memory address, the address offset is positive, and the carry out from neither the first adder nor the second adder is 1, or
if control signal is set for the first memory address, the address offset is negative, and the carry out from the first adder 1, or
if the control signal is set for the second memory address, the address offset is positive, and the carry out from the first adder is 0, or
if the control signal is set for the second memory address, the address offset is negative, and the carry outs from both the first adder and the second adder are 1; and
to select the output of the second adder
if the control signal is set for the first memory address, the address offset is positive, and the carry out from at least one of the first adder or the second adder is 1, or
if the control signal is set for the first memory address, the address offset is negative, and the carry out from the first adder is 0, or
if the control signal is set for the second memory address, the address offset is positive, and the carry out from the first adder is 1, or
if the control signal is set for the second memory address, the address offset is negative, and the carry out from at least one of the first adder or the second adder is 0.

8. An apparatus generating addresses for circular address buffers having an implied high address boundary in a memory, comprising:
inputs that receive a current address A, an address offset M, and a buffer length value L; and
logic configured to compute a memory address for locations in the memory in response to A, M, and L, wherein the memory address corresponds the current address A plus the address offset M for a circular buffer having address boundary Y and comprising addresses Y through (Y−L);
wherein L is a value that when expressed in binary has a leading 1 at bit position N, and the address boundary Y is computed by replacing lower N bits of current address A with 1's.

9. The apparatus of claim 8, wherein said inputs include registers storing A, M and L.

10. The apparatus of claim 8, wherein said logic includes:
a first adder to produce a first output equal to a sum A+M with a carry out signal;
a second adder to produce a second output equal to a first wrap address sum (A+M)−(L+1) (L+1) when the sign of M is positive or a second wrap address sum (A+M)+(L+1) when the sign M is negative, with a carry out signal; and
select loge to select the first output or the second output in response to the carry out signals from the first and second adders.

11. The apparatus of claim 8, wherein said logic includes:
a first adder to produce a first output equal to a sum A+M with a carry out signal at bit position N;
a second adder to produce a second output equal to a first wrap address sum (A+M)−(L+1) when the sign of M is positive or a second wrap address sum (A+M)+(L+1) when the sign of M is negative, with a carry out signal at bit position N; and
select logic to select the first output or the second output in response to the carry out signals from the first and second adders.

12. The apparatus of claim 11, wherein said select logic is configured:
to select the output of the first adder
if the address offset is positive, and the carry out from the first adder is 0, or
if the address offset is negative, and the carry outs from both the first adder and the second adder are 1; and
to select the output of the second adder
if the address offset is positive, and the carry out from the first adder is 1, or
if the address offset is negative, and the carry out from at least one of the first adder or the second adder is 0.

13. An integrated circuit, comprising:
a processor;
registers coupled with the processor that store a current address A, an address offset M, a buffer length value L;

memory; and an address generator coupled with the processor to generate addresses for a first circular buffer having address boundary X and including addresses X through (X+L) or in a second circular buffer having address boundary Y and comprising addresses Y through (Y−L) in the memory, the address generator configured to compute a memory address for locations in the memory in response to A, M, and L, and in response to a control signal identifying one of the first circular buffer or the second circular buffer, wherein the memory address corresponds to the current address A plus the address offset M within the first circular buffer if the control signal identifies the first circular buffer and the memory address corresponds to the current address A plus the address offset M within the second circular buffer if the control signal identifies the second circular buffer.

14. The integrated circuit of claim 13, wherein L is a value that when expressed in binary has a leading 1 at bit position N, and the address boundary X is computed by replacing the lower N bits of current address A with 0's, and the address boundary Y is computed by replacing the lower N bits of current address A with 1's.

15. The integrated circuit of claim 13, wherein said processor includes a decoder which responds to instructions to store the values A, M and L in said registers.

16. The integrated circuit of claim 13, wherein the value M and the control signal are stored in a single register of said registers.

17. The integrated circuit of claim 13, wherein said address generator includes:

a first adder to produce a first output equal to a sum A+M with a carry out signal;

a second adder to produce a second output equal to a first wrap address sum (A+M)−(L+1) when the sign of M is positive or a second wrap address sum (A+M)+(L+1) when the sign of M is negative, with a carry oat signal; and select logic to select the first output or the second output in response to the carry out signals from the first and second adders.

18. The integrated circuit of claim 13, wherein L is a value that when expressed in binary has a leading 1 at bit position N, and the address boundary X is computed by replacing the lower N bits of current address A with 0's, and the address boundary Y is computed by replacing the lower N bits of current address A with 1's, and said address generator includes:

a first adder to produce a first output equal to a sum A+M with a carry out signal at bit position N;

a second adder to produce a second output equal to a first wrap address sum (A+M)−(L+1) when the sign of M is positive or a second wrap address sum (A+M)+(L+1) when the sign of M is negative, with a carry out signal at bit position N; and select logic to select the first output or the second output in response to the carry out signals from the first and second adders, and in response to the control signal.

19. The integrated circuit of claim 18, wherein said select logic is configured:

to select the output of die first adder if control signal is set for the first memory address, the address offset is positive, and the carry out from neither the first adder nor the second adder is 1, or if control signal is set for the first memory address, the address offset is negative, and the carry out from the first adder is 1, or if the control signal is set for the second memory address, the address offset is positive, and the carry out from the first adder is 0, or if the control signal is set for the second memory address, the address offset is negative, and the carry outs from both the first adder and the second adder are 1; and to select the output of the second adder if the control signal is set for the first memory address, the address offset is positive, and the carry out from at least one of the first adder or the second adder is 1, or if the control signal is set for the first memory address, the address offset is negative, and the carry out from the first adder is 0, or if the control signal is set for the second memory address, the address offset is positive, and the carry out from the first adder is 1, or if the control signal is set for the second memory address, the address offset is negative, and the carry out from at least one of the first adder or the second adder is 0.

20. An integrated circuit, comprising:

a processor;

registers coupled with the processor that store a current address A, an address offset M, a buffer length value L;

memory; and an address generator generating addresses for circular address buffers having an implied high address boundary in a memory configured to compute a memory address for locations in the memory in response to A, M, and L, and to provide the memory addresses, wherein the memory address corresponds the current address A plus the address offset M for a circular buffer having address boundary Y and comprising addresses Y through (Y−L):

wherein L is a value that when expressed in binary has a leading 1 at bit position N, and the address boundary Y is computed by replacing the lower N bits of current address A with 1's.

21. The integrated circuit of claim 20, wherein said processor includes a decoder which responds to instructions to store the values A, M and L in said registers.

22. The integrated circuit of claim 20, wherein said address generator includes:

a first adder to produce a first output equal to a sum A+M with a carry out signal;

a second adder to produce a second output equal to a first wrap address sum (A+M)−(L+1) when the sign of M is positive or a second wrap address sum (A+M)−(L+1) when the sign of M is negative, with a carry out signal; and select logic to select the first output or the second output in response to the carry out signals from the first and second adders.

23. The integrated circuit of claim 20, wherein said address generator includes:

a first adder to produce a first output equal to a sum A+M with a carry out signal at bit position N;

a second adder to produce a second output equal to a first wrap address sum (A+M)−(L+1) when the sign of M is positive or a second wrap address sum (A+M)−(L+1) when the sign of M is negative, with a carry out signal at bit position N; and select logic to select the first output or the second output in response to the carry out signals from the first and second adders.

24. The integrated circuit of claim 23, wherein said select logic is configured:

to select the output of the first adder
- if the address offset is positive, and the carry out from the first adder is 0, or
- if the address offset is negative, and the carry outs from both the first adder and the second adder are 1; and to select the output of the second adder
- if the address offset is positive, and the carry out from the first adder is 1, or
- if the address offset is negative, and the carry out from at least one of the first adder or the second adder is 0.

* * * * *